W. C. SHIPHERD.
Bolt.
No. 203,658.  Patented May 14, 1878.
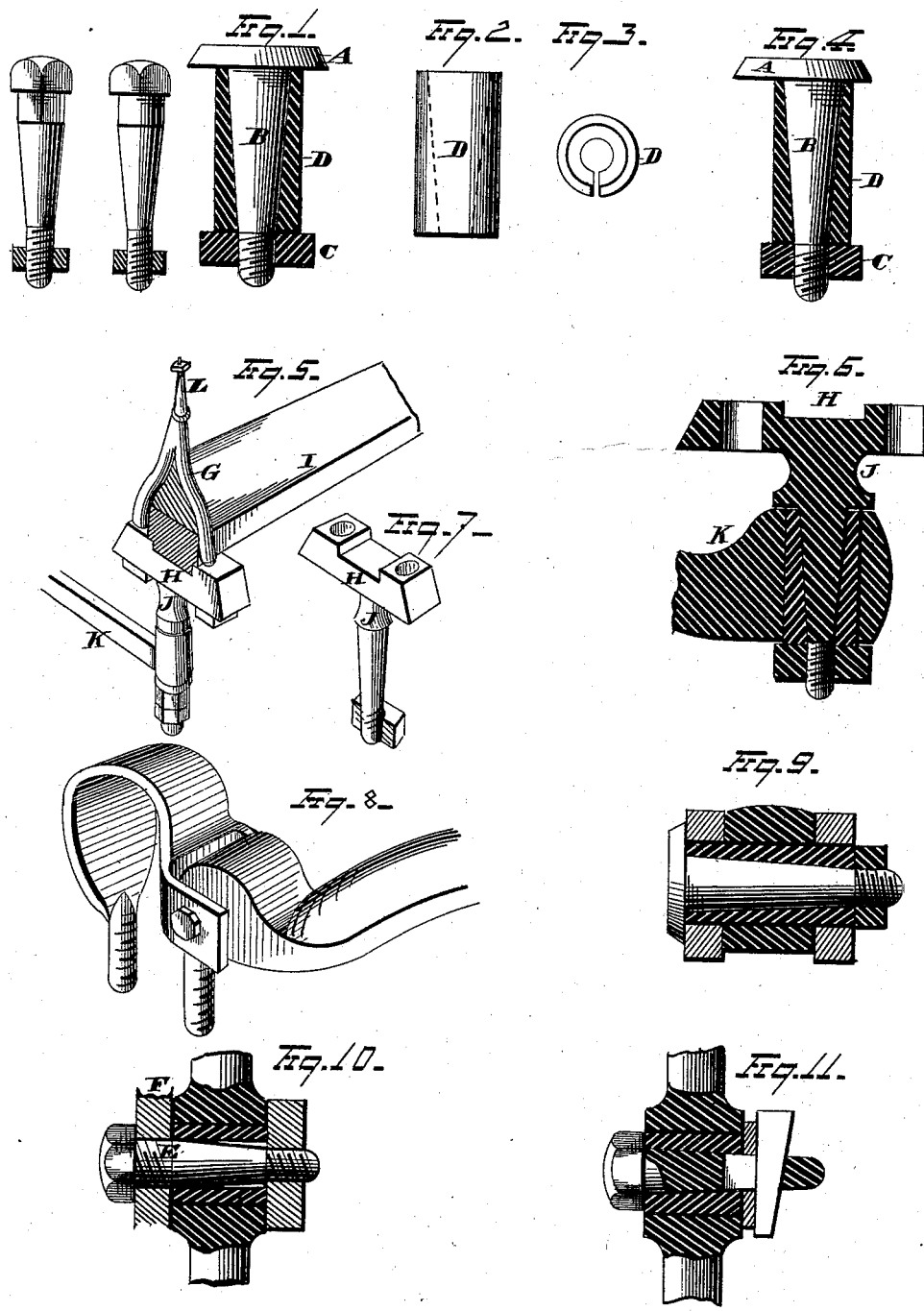

UNITED STATES PATENT OFFICE.

WILLIAM C. SHIPHERD, OF CLEVELAND, OHIO.

IMPROVEMENT IN BOLTS.

Specification forming part of Letters Patent No. 203,658, dated May 14, 1878; application filed October 29, 1877.

*To all whom it may concern:*

Be it known that I, WILLIAM C. SHIPHERD, of Cleveland, in the county of Cuyahoga and State of Ohio, have invented certain new and useful Improvements in Bolts; and I do hereby declare the following to be a full, clear, and exact description of the invention, such as will enable others skilled in the art to which it pertains to make and use it, reference being had to the accompanying drawings, which form part of this specification.

My invention relates to a new and useful improvement in bolts, designed more especially for that class of bolts which serve as journals to sustain wear—as, for instance, king-bolts of carriages, &c.; bolts employed in thill-couplings, and as studs or journals for sewing-machine wheels; so, also, in vehicle-springs for fastening the parts together, and in all other localities where, by continued use, those parts wear loose.

The nature of my invention consists in a conical bolt made to taper along the entire portion of its body, which operates as a journal-bearing, and, in connection therewith, a washer or packing made cylindrical upon its outer surface, but tapering upon its inner surface, to correspond with the taper of the bolt, the said bolt, with its packing, being thereby adapted to cylindrically-bored hubs or eyes.

In the drawing, Figure 1 is a representation of a bolt exhibiting my invention. Fig. 2 is a side elevation, and Fig. 3 an end view, of the packing. Fig. 4 represents the bolt having its shaft eccentric with the head—such as is ordinarily employed in vehicle-springs. Fig. 5 represents the bolt as forming a part of the coupling-plate which joins the fork ends of a vehicle king-bolt clip, the upper end of the said clip or king-bolt proper being constructed in like manner. Fig. 6 represents a separate view, in section and on an enlarged scale, of the said coupling-bar of king-bolt clip last referred to. Fig. 7 is a view of the said bolt with the packing removed. Figs. 8 and 9 show its application in a thill-coupler. Fig. 10 represents a variation, in which the packing is made cylindrical, both inside and out, and wherein the said packing is made to hug the conical surface of the bolt, and at the same time be expanded against the cylindrical surface of the eye or hub by the endwise compression exerted by the nut. It is represented in said figure as adapted to the hub of a sewing-machine wheel or other wheel. Fig. 11 represents another variation of my invention.

This device is designed as an improvement upon the device patented to me June 12, 1877, No. 192,023. In the device covered by the said patent the packing was made cylindrical upon its outer surface, so as to adapt the bolt to a cylindrical eye or hub; but the bolt and nut were made double-conical, so as thereby to expand the packing into the hub or eye. That contrivance necessitated a conical nut of an expensive nature. This invention is designed to effect the same purpose—that is, to be adapted to cylindrical hubs or eyes, yet employing simply a bolt having a conical shaft and an ordinary nut with cylindrical packing upon its outer surface and upon its inner surface adapted to the exterior surface of the cone.

A is the head of a bolt; B, its shaft, made conical throughout its whole length, or along that portion which forms the bearing; or it may first have a square or cylindrical neck beneath the head, and then terminate in conical form, as shown in Fig. 1. C is an ordinary nut. D is a packing of leather, or metal, or rawhide, or other material, as may be desired. The shaft B of the bolt is made to taper from the head toward the end, and at its end is terminated, preferably, in cylindrical form, and provided with a screw-thread, upon which the end of the nut is run.

The operation of the device is very simple. The packing D is slipped upon the shaft B of the bolt, and it is then inserted into the eye or hub which is to have a motion or wear upon it. The nut C is then run on, and coming in contact with the packing D swells it firmly against the interior of the hub or eye. In case the packing should become so much worn as to allow of lost motion or rattle, this wear can be compensated by simply taking a turn upon the nut, which, by forcing the packing farther upon the conical bolt B, will swell it out and compensate for the said wear.

In Fig. 1 is presented at the right a bolt wherein the taper extends from the head down to the threaded end, while at the left, in the same figure, I show other forms, wherein the neck beneath the head is cylindrical for a short distance, and wherein the said neck is angular or square, and is then tapered along that portion which is to receive the bearing, and is then terminated in a cylindrical portion, which receives the nut. This last form is particularly adapted for such uses as require that the bolt shall pass first through a support and then through a hub or eye—as, for instance, to form the stud of a sewing-machine drive-wheel, such as is shown in Fig. 10, wherein E is the straight portion which passes through the sewing-machine frame or upright F. This device may be employed in many ways without departing from the principle of my invention—as, for instance, in vehicle-springs, for attaching the separate parts of the spring together, such a bolt may be used as is shown in Fig. 4, wherein the shaft of the bolt is made eccentric with the head.

So, also, as shown in Figs. 5, 6, and 7, the bolt may be made in a single piece with the coupling-bar of a king-bolt clip on a vehicle, G being the clip, the prongs of which extend through the coupling-bar H beneath the axle I, J being the bolt, formed solid with the coupling-bar H, and extending downward, so as to form the bearing for the reach-brace K.

In like manner it is equally well adapted in thill-couplers, and other like localities, as shown in Figs. 8 and 9.

So, also, as shown in Fig. 5, the king-bolt L may itself be formed in like manner.

I have shown these several variations of my invention for the purpose of demonstrating its various uses, and to show that I do not limit my invention to any particular style of bolt, but desire to be understood as claiming, broadly, such a construction of bolt as shall present a single conical surface throughout its entire bearing length, upon which is a packing cylindrical on its exterior surface, so as to adapt the said bolt to cylindrically-bored hubs or eyes, the said packing being forced to a snug bearing upon the conical surface and the interior of the hub or eye by the action of a common nut.

It is not absolutely essential, though preferable, that the interior of the packing should be made conical, to correspond with the conical surface of the bolt, for it is apparent that the packing might be made cylindrical both inside and outside, as shown in Fig. 10, but of such character as to be expanded to a snug bearing against both the surface of the hub or eye and the surface of the bolt by a common nut, as there shown.

It is not absolutely essential that the tapered bolt should be terminated with a threaded end for the reception of the nut, for the end of the bolt might be provided with a slot for the reception of a wedge-key, which key might be made to exert a compensating pressure against a washer, which, in turn, would communicate the required pressure against the packing, as shown in Fig. 11.

What I claim is—

1. A bolt having a tapered stem or shaft formed throughout its entire bearing length, in combination with a packing which extends along the said bearing-surface, substantially as described.

2. A bolt having a conical stem throughout its entire bearing length, and provided with a packing, the exterior surface of which latter is cylindrical, and extends along the stem, in combination with suitable means, as described, for forcing the said packing against the surface of the bolt and the interior of the hub or eye bearing thereon, substantially as described.

3. The combination, with a cylindrically-bored hub or eye, of a bolt having its entire bearing-surface made singly conical, a packing which is cylindrical and surrounds the said conical bearing, and a common nut or its equivalent, substantially as described.

In testimony whereof I have signed my name to this specification in the presence of two subscribing witnesses.

WM. C. SHIPHERD.

Witnesses:
F. TOUMEY,
W. E. DONNELLY.